June 23, 1925.

H. J. THOMPSON

FRUIT CONTAINER

Filed Feb. 11, 1922     2 Sheets-Sheet 1

1,543,038

Inventor
H. J. Thompson
By C. A. Snow & Co.
Attorneys

June 23, 1925.  1,543,038
H. J. THOMPSON
FRUIT CONTAINER
Filed Feb. 11, 1922   2 Sheets-Sheet 2

H.J.Thompson Inventor

By C.A.Snow&Co.
Attorney

Patented June 23, 1925.

1,543,038

UNITED STATES PATENT OFFICE.

HARRY J. THOMPSON, OF SAN FRANCISCO, CALIFORNIA, ASSIGNOR TO NATIONAL FIBREFORM COMPANY, OF SAN FRANCISCO, CALIFORNIA.

FRUIT CONTAINER.

Application filed February 11, 1922. Serial No. 535,833.

*To all whom it may concern:*

Be it known that I, HARRY J. THOMPSON, a citizen of the United States, residing at San Francisco, in the county of San Francisco and State of California, have invented a new and useful Fruit Container, of which the following is a specification.

This invention relates to a container for fruit such as ripe figs, one of the objects of the invention being to provide molded trays formed of fibrous cushioning material such as paper pulp and which trays are adapted to be arranged in pairs, the trays of each pair being oppositely disposed and having matching recesses therein whereby the fruit can be held immovably, each article of fruit being out of contact with the other fruits held between the trays.

A further object is to provide trays of this character which are porous and capable of absorbing moisture so that should one of the articles of fruit held between the trays be decayed the moisture will be absorbed by the trays and will not be allowed to act upon any of the other fruits therebetween with the result that the other fruit will be maintained in good condition.

A further object is to provide trays so constructed as to absorb shocks and thus prevent injury to the fruits held thereby.

A further object is to provide trays which, when arranged in pairs, will nest together so as to occupy the minimum space.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
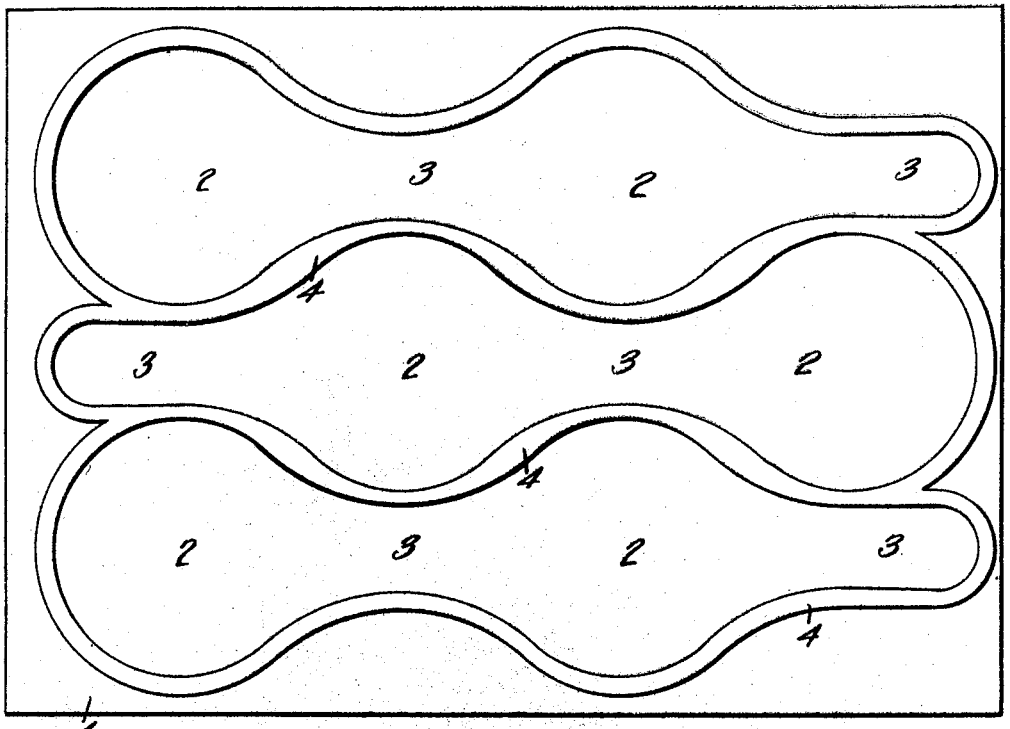
Figure 1 is a plan view of the recessed face of one of the trays.
Figure 3:
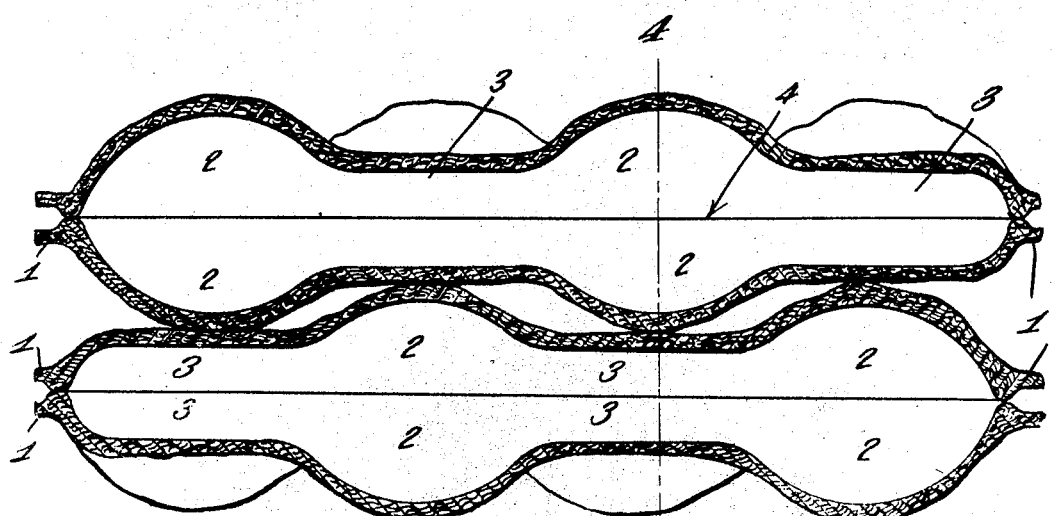
Figure 3 is a transverse section through two pairs of superposed trays.
Figure 4:
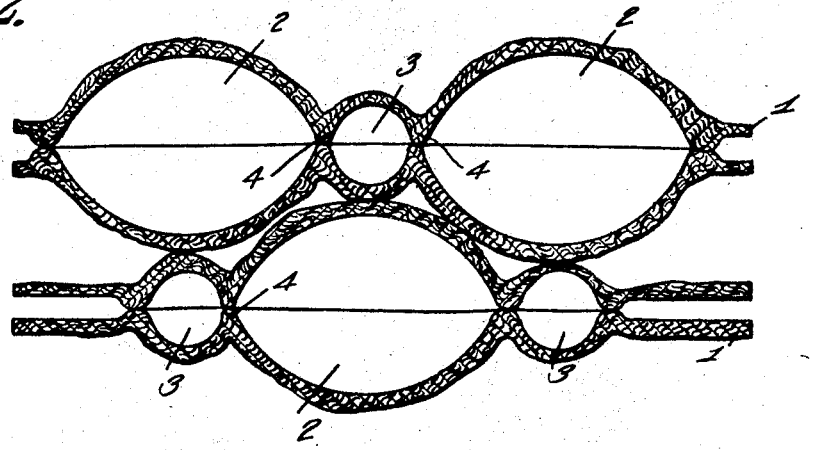
Figure 4 is a section on line 4—4, Figure 3.

Referring to the figures by characters of reference 1 designates a tray formed preferably of paper pulp although it is to be understood that it can be made of any other fibrous pulp capable of cushioning and which is porous so as to absorb moisture. Each tray is formed with parallel series of communicating depressions indicated at 2, the depressions of each series communicating through passages or necks 3 and the rows of depressions being separated by walls 4. Obviously the depressions are to be shaped to correspond substantially with the contour of one-half of the article of fruit to be packed and when ripe figs are to be packed the shape will be substantially such as shown in Figure 1. The trays are molded to proper form and are then assembled in pairs, so that the recesses in one tray of each pair will match the recesses in the opposed tray of said pair. This matching is done after the articles of fruit have been placed in the recesses. After several pairs of trays have been assembled in this way with the fruit therebetween, the said pairs can be superposed so as to nest as shown in Figures 3 and 4, the projections formed by the depressions or recesses 2 lying upon the walls of the necks 3 as shown in Figures 3 and 4.

Figure 2:
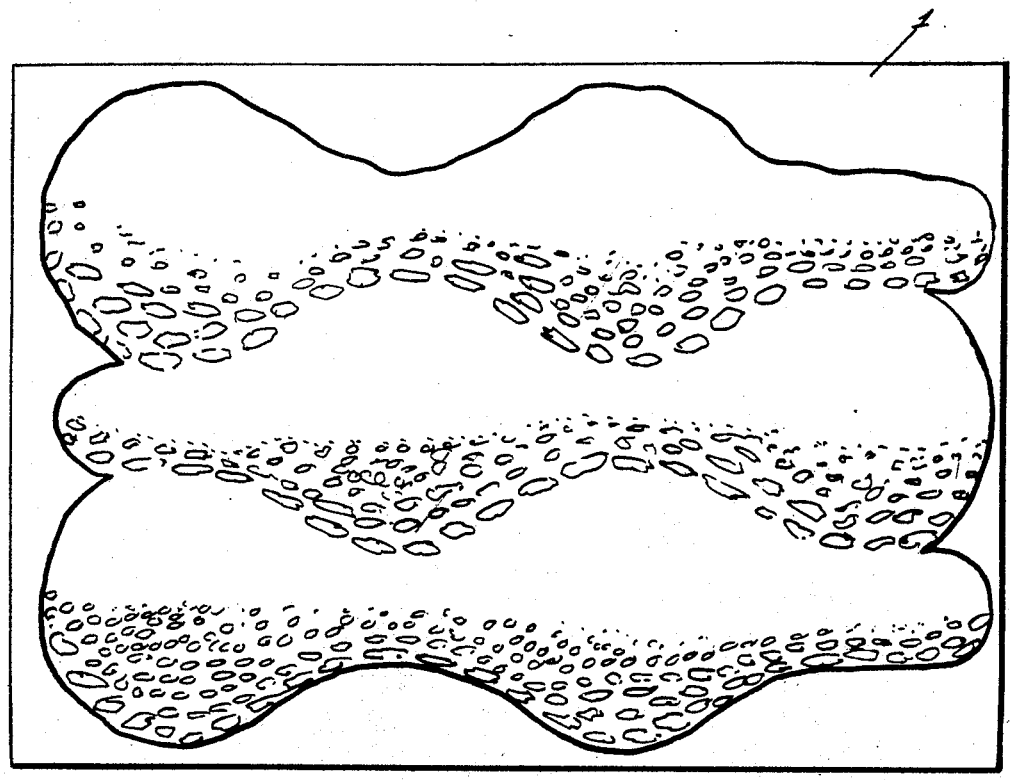
Figure 2 is a plan view of the opposite face of one of the trays.

As before stated the trays are made of a porous absorbent material such as paper pulp. As shown in Figure 2 the inactive or outer faces of the trays are rough so that when these faces of opposed trays contact they serve to cushion the trays and absorb shocks, thus protecting the fruits from the bruises to which they would otherwise be subjected.

What is claimed is:—

A structure of the class described comprising separate pairs of molded trays, each tray formed of absorbent cushioning material, the trays of each pair being oppositely disposed, each of said trays having recesses in one face matching corresponding recesses in the opposed tray, there being depressions between the recesses in each tray forming necks, the trays being provided with dome-like projections corresponding with the recesses therein, the dome-like projections on the trays of one pair being adapted to nest between the corresponding projections on the trays of the next adjoining pairs and to bear substantially at single points of contact upon the neck portions of the trays, thereby providing transverse and longitudinal air spaces between the trays.

In testimony that I claim the foregoing as my own, I have hereto affixed my signature in the presence of two witnesses.

HARRY J. THOMPSON.

Witnesses:
R. W. SALISBURY,
L. B. EATON.